United States Patent
Beems Hart et al.

(10) Patent No.: US 8,259,668 B2
(45) Date of Patent: Sep. 4, 2012

(54) COMMUNICATION SYSTEMS

(75) Inventors: Michael John Beems Hart, London (GB); Yuefeng Zhou, Oxshott (GB)

(73) Assignee: Fujitsu Limited, Kawasaki (JP)

( * ) Notice: Subject to any disclaimer, the term of this patent is extended or adjusted under 35 U.S.C. 154(b) by 225 days.

(21) Appl. No.: 12/377,641

(22) PCT Filed: Jul. 31, 2007

(86) PCT No.: PCT/GB2007/002896
§ 371 (c)(1),
(2), (4) Date: Apr. 6, 2010

(87) PCT Pub. No.: WO2008/020164
PCT Pub. Date: Feb. 21, 2008

(65) Prior Publication Data
US 2010/0189050 A1    Jul. 29, 2010

(30) Foreign Application Priority Data

Aug. 18, 2006  (GB) .................................. 0616482.6
Nov. 29, 2006  (GB) .................................. 0623861.2

(51) Int. Cl.
*H04W 4/00* (2009.01)
*H04J 4/00* (2006.01)

(52) U.S. Cl. .................... 370/330; 370/436; 370/478

(58) Field of Classification Search .......... 370/328–330, 370/33, 343, 345, 395.4, 436, 442, 458, 468, 370/478–480, 498
See application file for complete search history.

(56) References Cited

U.S. PATENT DOCUMENTS 5,752,193 A * 5/1998 Scholefield et al. ....... 455/452.2
(Continued)

FOREIGN PATENT DOCUMENTS

EP        1677443        12/2005
(Continued)

OTHER PUBLICATIONS

Japanese Office Action, Application No. 2009-525095, with English Translation, 10 pages, May 25, 2011.
(Continued)

*Primary Examiner* — Ronald Abelson
(74) *Attorney, Agent, or Firm* — Baker Botts L.L.P.

(57) ABSTRACT

A transmission method for use in a multi-hop wireless communication system is provided. The system includes a source apparatus, a destination apparatus and one or more intermediate apparatuses, said source apparatus being operable to transmit information in a communication direction along a series of links forming a communication path extending from the source apparatus to the destination apparatus via the or each intermediate apparatus, and the or each intermediate apparatus being operable to receive information from a previous apparatus along the path and to transmit the received information to a subsequent apparatus along the path, the system having access to a time-frequency format for use in assigning available transmission frequency bandwidth for transmission in the communication direction during a discrete transmission interval, said format defining a plurality of transmission windows within such an interval, each window occupying a different part of that interval and having a frequency bandwidth profile within said available transmission frequency bandwidth over its part of that interval, each said window being assignable for such a transmission interval to one of said apparatuses for use in transmission. The method includes transmitting reservation information for use in a particular such transmission interval from a first one of said apparatuses to a second one of said apparatuses, the second apparatus being the or one of the intermediate apparatuses, and the reservation information specifying at least one transmission window to be reserved of the particular transmission interval. The method also includes, in the second apparatus, reserving the specified window(s) of the particular transmission interval in dependence upon the received reservation information.

21 Claims, 8 Drawing Sheets

WiMAX relay system

U.S. PATENT DOCUMENTS

2005/0227722 A1* 10/2005 Harris et al. .................. 455/518
2005/0286426 A1 12/2005 Padhye et al.
2006/0264172 A1 11/2006 Izumikawa et al. .......... 455/11.1

FOREIGN PATENT DOCUMENTS

| JP | 2002124953 | 4/2002 |
|---|---|---|
| JP | 2006020290 | 1/2006 |
| WO | 03/058984 | 7/2003 |
| WO | WO 2005/025102 A1 | 3/2005 |
| WO | 2005/067173 | 7/2005 |

OTHER PUBLICATIONS

International Search Report; PCT/GB2007/002869; pp. 3, Dec. 3, 2007.

* cited by examiner

RS safety region allocation in the DL

RS safety region allocation in the UL

Examples of RS region

WiMAX relay system

An example of the operations to allocate RS region

A BS can directly instruct an RS region without any request from RSs

PRIOR ART

PRIOR ART

Example TDD frame structure from OFDMA physical layer of the IEEE802.16 standard

PRIOR ART

COMMUNICATION SYSTEMS

RELATED APPLICATIONS

This application claims foreign priority benefits under 35 U.S.C. §119 of International Application No. PCT/GB2007/002896, filed Jul. 31, 2007, entitled "Communication Systems"; United Kingdom Application No. GB 0623861.2, filed on Nov. 29, 2006, entitled "Communication Systems"; and United Kingdom Application No. GB 0616482.6, filed on Aug. 18, 2006, entitled "Communication Systems".

OVERVIEW

Currently there exists significant interest in the use of multihop techniques in packet based radio and other communication systems, where it is purported that such techniques will enable both extension in coverage range and increase in system capacity (throughput).

In a multi-hop communication system, communication signals are sent in a communication direction along a communication path (C) from a source apparatus to a destination apparatus via one or more intermediate apparatuses. FIG. 6 illustrates a single-cell two-hop wireless communication system comprising a base station BS (known in the context of 3G communication systems as "node-B" NB) a relay node RN (also known as a relay station RS) and a user equipment UE (also known as mobile station MS). In the case where signals are being transmitted on the downlink (DL) from a base station to a destination user equipment (UE) via the relay node (RN), the base station comprises the source station (S) and the user equipment comprises the destination station (D). In the case where communication signals are being transmitted on the uplink (UL) from a user equipment (UE), via the relay node, to the base station, the user equipment comprises the source station and the base station comprises the destination station. The relay node is an example of an intermediate apparatus (I) and comprises: a receiver, operable to receive data from the source apparatus; and a transmitter, operable to transmit this data, or a derivative thereof, to the destination apparatus.

Simple analogue repeaters or digital repeaters have been used as relays to improve or provide coverage in dead spots. They can either operate in a different transmission frequency band from the source station to prevent interference between the source transmission and the repeater transmission, or they can operate at a time when there is no transmission from the source station.

FIG. 7 illustrates a number of applications for relay stations. For fixed infrastructure, the coverage provided by a relay station may be "in-fill" to allow access to the communication network for mobile stations which may otherwise be in the shadow of other objects or otherwise unable to receive a signal of sufficient strength from the base station despite being within the normal range of the base station. "Range extension" is also shown, in which a relay station allows access when a mobile station is outside the normal data transmission range of a base station. One example of in-fill shown at the top right of FIG. 7 is positioning of a nomadic relay station to allow penetration of coverage within a building that could be above, at, or below ground level.

Other applications are nomadic relay stations which are brought into effect for temporary cover, providing access during events or emergencies/disasters. A final application shown in the bottom right of FIG. 7 provides access to a network using a relay positioned on a vehicle.

Relays may also be used in conjunction with advanced transmission techniques to enhance gain of the communications system as explained below.

It is known that the occurrence of propagation loss, or "pathloss", due to the scattering or absorption of a radio communication as it travels through space, causes the strength of a signal to diminish. Factors which influence the pathloss between a transmitter and a receiver include: transmitter antenna height, receiver antenna height, carrier frequency, clutter type (urban, sub-urban, rural), details of morphology such as height, density, separation, terrain type (hilly, flat). The pathloss L (dB) between a transmitter and a receiver can be modelled by:

$$L = b + 10n \log d \quad (A)$$

Where d (metres) is the transmitter-receiver separation, b(db) and n are the pathloss parameters and the absolute pathloss is given by $l = 10^{(L/10)}$.

The sum of the absolute path losses experienced over the indirect link SI+ID may be less than the pathloss experienced over the direct link SD. In other words it is possible for:

$$L(SI) + L(ID) < L(SD) \quad (B)$$

Splitting a single transmission link into two shorter transmission segments therefore exploits the non-linear relationship between pathloss verses distance. From a simple theoretical analysis of the pathloss using equation (A), it can be appreciated that a reduction in the overall pathloss (and therefore an improvement, or gain, in signal strength and thus data throughput) can be achieved if a signal is sent from a source apparatus to a destination apparatus via an intermediate apparatus (e.g. relay node), rather than being sent directly from the source apparatus to the destination apparatus. If implemented appropriately, multi-hop communication systems can allow for a reduction in the transmit power of transmitters which facilitate wireless transmissions, leading to a reduction in interference levels as well as decreasing exposure to electromagnetic emissions. Alternatively, the reduction in overall pathloss can be exploited to improve the received signal quality at the receiver without an increase in the overall radiated transmission power required to convey the signal.

Multi-hop systems are suitable for use with multi-carrier transmission. In a multi-carrier transmission system, such as FDM (frequency division multiplex), OFDM (orthogonal frequency division multiplex) or DMT (discrete multi-tone), a single data stream is modulated onto N parallel sub-carriers, each sub-carrier signal having its own frequency range. This allows the total bandwidth (i.e. the amount of data to be sent in a given time interval) to be divided over a plurality of sub-carriers thereby increasing the duration of each data symbol. Since each sub-carrier has a lower information rate, multi-carrier systems benefit from enhanced immunity to channel induced distortion compared with single carrier systems. This is made possible by ensuring that the transmission rate and hence bandwidth of each subcarrier is less than the coherence bandwidth of the channel. As a result, the channel distortion experienced on a signal subcarrier is frequency independent and can hence be corrected by a simple phase and amplitude correction factor. Thus the channel distortion correction entity within a multicarrier receiver can be of significantly lower complexity of its counterpart within a single carrier receiver when the system bandwidth is in excess of the coherence bandwidth of the channel.

Orthogonal frequency division multiplexing (OFDM) is a modulation technique that is based on FDM. An OFDM system uses a plurality of sub-carrier frequencies which are orthogonal in a mathematical sense so that the sub-carriers' spectra may overlap without interference due to the fact they are mutually independent. The orthogonality of OFDM systems removes the need for guard band frequencies and thereby increases the spectral efficiency of the system. OFDM has been proposed and adopted for many wireless systems. It is currently used in Asymmetric Digital Subscriber Line (ADSL) connections, in some wireless LAN applications (such as WiFi devices based on the IEEE802.11a/g standard), and in wireless MAN applications such as WiMAX (based on the IEEE 802.16 standard). OFDM is often used in conjunction with channel coding, an error correction technique, to create coded orthogonal FDM or COFDM. COFDM is now widely used in digital telecommunications systems to improve the performance of an OFDM based system in a multipath environment where variations in the channel distortion can be seen across both subcarriers in the frequency domain and symbols in the time domain. The system has found use in video and audio broadcasting, such as DVB and DAB, as well as certain types of computer networking technology.

In an OFDM system, a block of N modulated parallel data source signals is mapped to N orthogonal parallel sub-carriers by using an Inverse Discrete or Fast Fourier Transform algorithm (IDFT/IFFT) to form a signal known as an "OFDM symbol" in the time domain at the transmitter. Thus, an "OFDM symbol" is the composite signal of all N sub-carrier signals. An OFDM symbol can be represented mathematically as:

$$x(t) = \frac{1}{\sqrt{N}} \sum_{n=0}^{N-1} c_n \cdot e^{j2\pi n \Delta f t}, \ 0 \le t \le T_s \quad (1)$$

where $\Delta f$ is the sub-carrier separation in Hz, $T_s = 1/\Delta f$ is symbol time interval in seconds, and $c_n$ are the modulated source signals. The sub-carrier vector in (1) onto which each of the source signals is modulated $c \in C_n$, $c=(c_0, c_1 \ldots c_{N-1})$ is a vector of N constellation symbols from a finite constellation. At the receiver, the received time-domain signal is transformed back to frequency domain by applying Discrete Fourier Transform (DFT) or Fast Fourier Transform (FFT) algorithm.

OFDMA (Orthogonal Frequency Division Multiple Access) is a multiple access variant of OFDM. It works by assigning a subset of sub-carriers, to an individual user. This allows simultaneous transmission from several users leading to better spectral efficiency. However, there is still the issue of allowing bi-directional communication, that is, in the uplink and download directions, without interference.

In order to enable bi-directional communication between two nodes, two well known different approaches exist for duplexing the two (forward or download and reverse or uplink) communication links to overcome the physical limitation that a device cannot simultaneously transmit and receive on the same resource medium. The first, frequency division duplexing (FDD), involves operating the two links simultaneously but on different frequency bands by subdividing the transmission medium into two distinct bands, one for forward link and the other for reverse link communications. The second, time division duplexing (TDD), involves operating the two links on the same frequency band, but subdividing the access to the medium in time so that only the forward or the reverse link will be utilizing the medium at any one point in time. Both approaches (TDD & FDD) have their relative merits and are both well used techniques for single hop wired and wireless communication systems. For example the IEEE802.16 standard incorporates both an FDD and TDD mode.

As an example, FIG. 8 illustrates the single hop TDD frame structure used in the OFDMA physical layer mode of the IEEE802.16 standard (WiMAX) which is incorporated herein by reference.

Each frame is divided into DL and UL subframes, each being a discrete transmission interval. They are separated by Transmit/Receive and Receive/Transmit Transition Guard interval (TTG and RTG respectively). Each DL subframe starts with a preamble followed by the Frame Control Header (FCH), the DL-MAP, and the UL-MAP.

The FCH contains the DL Frame Prefix (DLFP) to specify the burst profile and the length of the DL-MAP. The DLFP is a data structure transmitted at the beginning of each frame and contains information regarding the current frame; it is mapped to the FCH.

Simultaneous DL allocations can be broadcast, multicast and unicast and they can also include an allocation for another BS rather than a serving BS. Simultaneous ULs can be data allocations and ranging or bandwidth requests.

The frame structure in relay station (RS) should be well designed to keep compatibility with the standardized frame structure (FIG. 8 shows an example of standardized TDD frame structure in IEEE802.16 (WiMAX) standard), and avoid interference between the transmissions of base stations (BS), and mobile stations (MS). Normally, the frame structure in RS should guarantee the communication between BS and RS, BS and MS, or RS and MS. However, the inventors have come to the realization that communications from MS can experience interference from RS and BS communications.

SUMMARY OF EXAMPLE EMBODIMENTS

In accordance with one embodiment of the present invention, a transmission method for use in a multi-hop wireless communication system is provided. The system includes a source apparatus, a destination apparatus and one or more intermediate apparatuses, said source apparatus being operable to transmit information in a communication direction along a series of links forming a communication path extending from the source apparatus to the destination apparatus via the or each intermediate apparatus, and the or each intermediate apparatus being operable to receive information from a previous apparatus along the path and to transmit the received information to a subsequent apparatus along the path, the system having access to a time-frequency format for use in assigning available transmission frequency bandwidth for transmission in the communication direction during a discrete transmission interval, said format defining a plurality of transmission windows within such an interval, each window occupying a different part of that interval and having a frequency bandwidth profile within said available transmission frequency bandwidth over its part of that interval, each said window being assignable for such a transmission interval to one of said apparatuses for use in transmission. The method includes transmitting reservation information for use in a particular such transmission interval from a first one of said apparatuses to a second one of said apparatuses, the second apparatus being the or one of the intermediate apparatuses, and the reservation information specifying at least one transmission window to be reserved of the particular transmission interval. The method also includes, in the second apparatus, reserving the specified window(s) of the particular transmission interval in dependence upon the received reservation information.

BRIEF DESCRIPTION OF THE DRAWINGS

For a more complete understanding of particular embodiments of the present invention and their advantages, reference is now made to the following description, taken in conjunction with the accompanying drawings, in which.

DETAILED DESCRIPTION

1. Introduction

Figure 1A:
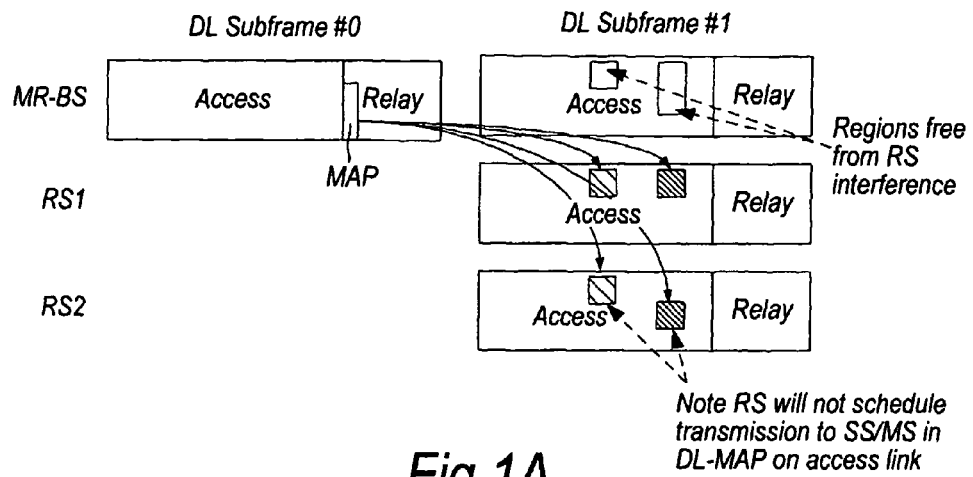
FIGS. 1A and 1B show schematically an embodiment of the present invention.

In a multihop relay based network with distributed control, the RS is responsible for resource allocation on its access link, constructing the DL and UL MAP information and associated IEs in the RS. Consequently, there exists no mechanism that enables the MR-BS (or superordinate RS) to send a message to the RS to instruct it not to use a region of the access downlink at the RS for transmission to the SSs that it serves.

The same problem also exists for the uplink, in that a superordinate RS or MR-BS cannot instruct an RS not to allocate transmission from an SS on the access link controlled by that RS.

The consequence is that the MR-BS is not able to assign cell-wide safety regions that are generally used in single hop systems to try and provide transmission regions in the DL or UL subframe that experience reduced or zero interference.

2. Details of Particular Embodiments

Embodiments of this invention introduce the concept of a superordinate node providing "reservation" information to a subordinate intermediate node that will effect the allocation of transmission opportunities in the access DL and UL that the node receiving the information controls. The simple example is of an MR-BS sending information to an RS to inform it not to utilize certain regions of the access DL and access UL. As a result the RS will not include resource allocation in the DL and UL MAP respectively, and consequently the RS will not transmit within this reserved region in the access DL interval and the SS or MS will not transmit within this reserved region on the access UL.

In order to enable this, two new messages are required to enable the MR-BS (or superordinate RS) to inform a subordinate RS of the reservation information. In embodiments of this invention these are called MR_DL_Safety_Region_IE and MR_UL_Safety_Region_IE. The messages contain the information regarding the region or window that cannot be used by the RS on the access DL and UL respectively. Upon receiving these messages, the RS may utilize existing messages to inform the MS that these regions are not in use. It can do this, in the case of IEEE802.16 based systems, using legacy messages. In the case of DL the RS will transmit a DL-MAP_IE using a DIUC of 13. Upon receiving such information, the SS/MS then knows to ignore any signal transmitted in the burst described by a DL-MAP_IE with DIUC 13 and hence the RS can transmit nothing (or a non-information-carrying signal) in this burst or region. In the case of the UL the RS will transmit a UL-MAP_IE with UIUC of 13 followed by the PAPR_reduction_and_safety_zone_allocation_IE, setting the type to safety zone allocation, to indicate to the SSs/MSs that they shall not transmit UL information in the indicated region.

The information from the MR-BS (or superordinate RS) may either be unicast, multicast or broadcast to subordinate RS9S). The superordinate RS or MR-BS can then use the reserved window for allocating transmissions to MS/SS that are experiencing performance degrading interference from the subordinate RS(s).

FIG. 1A shows how a command issued in DL subframe 0 from an MR-BS is acted upon in the access link in the next subframe by a subordinate RS. It is possible that the command could be persistent until deallocated or could be a one-off reservation, just for the next subframe. In this case, the RS indicates in its DL-MAP on the access link that this region is reserved by allocating a special burst with DIUC of 13. Consequently, no information will be carried by the RS in this special burst or region, hence the SS/MS can ignore this burst.

The cross-hatched region is a multicast safety region allocation where one instruction informs all RSs in a multicast group to reserve the window or region. The two shaded regions of different darknesses are examples of unicast safety region allocation, where only 1 RS reserves the window or region allocated in the IE. The white areas indicate the areas that are free from subordinate RS interference at the station (MR-BS in this case) issuing the IEs.

Figure 1B:
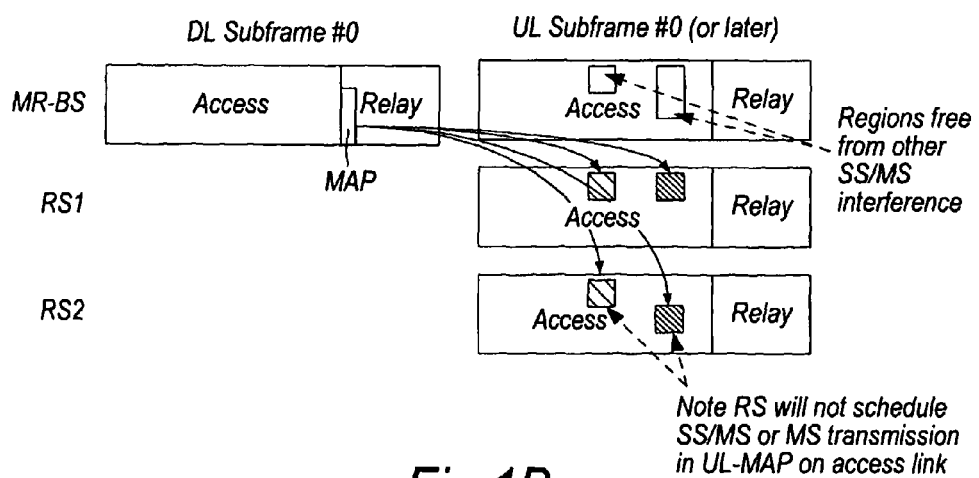

FIG. 1B shows similarly how a command issued in the DL subframe 0 from an MR-BS is acted upon in the access link of either the same or later subframe by a subordinate RS. In this case, the RS indicates in its UL-MAP on the access link that this region is reserved. Consequently SS/MS will not allocate transmissions within this region, they will skip it when an allocation spans it.

Whilst embodiments of this invention focus mainly on the use of the region or window for non-transmission, a further use is for the MR-BS to allocate regions of "don't care" transmissions. Such regions could then be used by all transmitters to transmit non-information-carrying waveforms, without the risk of interfering with information carrying waveforms. Such non-information carrying waveforms can be used to reduce peak-to-average-power ratio (PAPR) at a transmitter using a technique known as tone reservation (such a tone reservation is disclosed in a patent publication in the name of Samsung (WO2005/025102) and is incorporated in the 802.16 standard). A further use for the region or window could be for transmitting "sounding" waveforms, as mentioned in the 802.16 standard. In summary, this reserved region or window could be used over downlink connections for PAPR reduction or for no transmission, or over uplink connections for sounding (known waveform transmission), PAPR reduction or for no transmission.

A "non-information-carrying signal" may include a transmission made on some of the subcarriers that will not be processed by the receiver. No data is encoded onto these subcarriers. The modulation applied to the subcarriers is intended to reduce the variation of the overall signal waveform after the IFFT. The IFFT equation effectively sums a number of individual sinusoidal waveforms. As a result, the composite waveform can end up with large variations in amplitude. The idea behind PAPR reduction is to try to reduce these variations. One particular method is to make use of some "unused" data subcarriers to try to reduce the variation in the composite waveform. In that method, the "unused" data subcarriers are employed during transmission with the modulation applied to them being adjusted to reduce overall system PAPR, but without using those "unused" subcarriers to carry information to the receiver. Hence, the signal transmitted over those "unused" subcarriers may be called a "non-information-carrying signal".

A sounding signal is essentially a "well-known" or other "known" signal that could be used to identify the channel response at the receiver. The idea is that if you transmit a well-known signal (i.e. the receiver knows what was sent) it can determine the distortion induced by the channel. Hence the term "channel sounding" is used when transmitting such waveforms, as one is essentially sounding out the channel to get its properties. Such signals are usually defined to have special properties. In the case of OFDM, they are usually designed to have constant amplitude in the frequency domain to try to sound all subcarriers with equal weighting. This ensures that any error resulting for the sounding process due to noise is equally weighted across the channel response. Also, in the case of OFDM, it is desirable for signals to have a constant amplitude over time so that, as described above, the PAPR is as small as possible.

3. Summary of Benefits

The above embodiments demonstrate the concept of enabling superordinate apparatuses to reserve windows or regions at subordinate devices for non-transmission for the purposes of creating regions where the superordinate apparatus can guarantee reduced or interference-free communication with a SS or MS. Also provided is the mechanism for releasing the concept.

As a result the following benefits may be realized using particular embodiments:

A superordinate apparatus in a distributed system can have some degree of control over subordinate devices to enable interference management.

This enables the benefits of distributed control to be realized but provides a mechanism for centralized control of interference, essential in a system attempting to achieve single (or better) frequency reuse.

In summary, the BS (or RS) needs the capability (especially in distributed scheduling case) to tell the subordinate RS to reserve regions of the access link for non-transmission on both the DL and UL. This allows it to have some control over interference within the area that is covered by the BS and its subordinate RSs. Therefore, two messages can be envisaged. Both carried on the R-link (in the DL & UL-MAP), one to tell the RS a region not to use in the DL access link and the other in the UL access link.

The DL-MAP in the R-DL may contain a MR_DL_Safety_Zone_IE unicast to a single RS or multicast to a number of RS in a multicast group that assigns a region or window of non-transmission to the RS. The MR-BS can then utilize this window or region for transmission to MS that are experiencing interference from a particular RS or MS that is experiencing interference from all RSs (or a group of RSs). The same also applies for the safety zone allocation in the UL, in that the UL-MAP in the R-DL may contain a safety region allocation that allocates a region or window of non-transmission to the RS on the UL to prevent UL interference to MS transmission to the MR-BS.

An RS may also issue the IEs to subordinate RSs in the same manner as the MR-BS to prevent interference to MSs connected to the RS.

Details of the RS Region and System Operations

An example of how the window reservation described above can be used is in an RS region.

Figure 2:
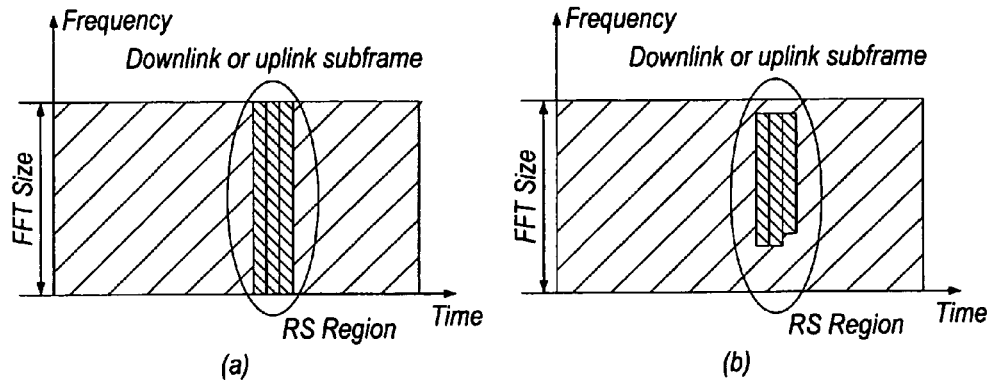
FIG. 2 shows examples of an RS region useful for understanding embodiments of the present invention.

Definition of RS Region:

To ensure a safe communication between RSs, a BS will allocate one or multiple RS regions in downlink subframe or uplink subframe. The size of this region can be multiple OFDM symbols (FIG. 2a), or multiple slots (FIG. 2b).

The RS region is used for RS's transmission and receiving. BS and MS will keep quiet within RS region, thus avoiding interference. Preferred regulations for RS region allocation are:

a. The RS region will be created and synchronized in subframes in RS, BS, and MS. The allocation and size will be instructed by BS;
b. Within RS region, MS and BS will keep quiet;
c. BS shall indicate which RSs have the right to transmit within the RS region;
d. One or more RSs can transmit information within a RS region;
e. Multiple RS regions can be allocated within the duration of downlink and uplink subframes The purposes of this RS region can be a. Exchange information (including data, and signalling) among RSs;
b. Exchange information (including data, and signalling) between RS and MS;
c. Exchange information (including data, and signalling) between RS and BS;
d. Pre-decided sequences can be added into RS region for channel sensing, and synchronization;

System Operations to Allocating RS Region

Figure 3:
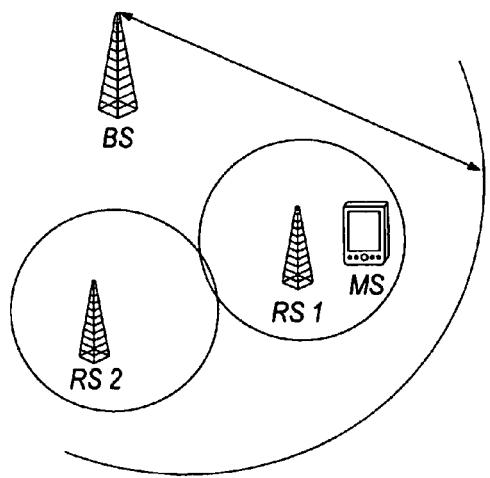
FIG. 3 shows a WiMAX relay system.

FIG. 3 shows the signalling diagram, when a relay station (FIG. 3) wants to request an RS region.

Figure 4:
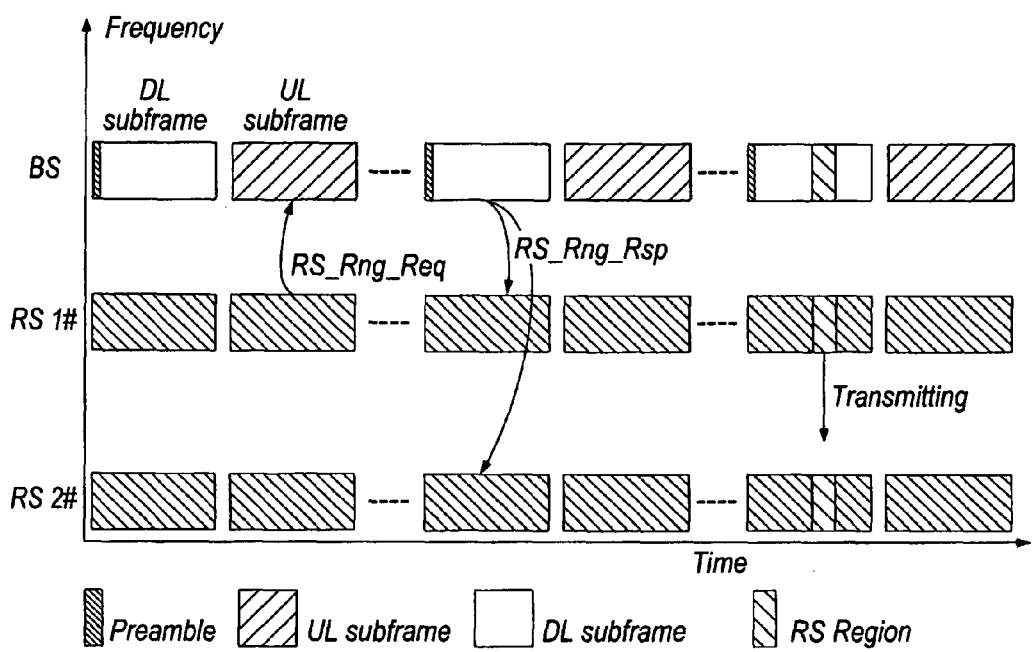
FIG. 4 shows an example of the operations to allocate RS region.

In FIG. 4, RS 1# sent RS_Rng_Req to BS to request an RS region, more information relating the transmission within a RS region can be enclosed in this message. BS will send an RS_Rng_Rsp message for response. BS can deny or approve RS region allocation. More information relating the transmission within a RS region can be enclosed in this message. For example, the reasons of denying, the locating and timing information of the RS region, and access method etc. If BS approve the RS region request, the corresponding RS region will be allocated in subframes.

Figure 5:
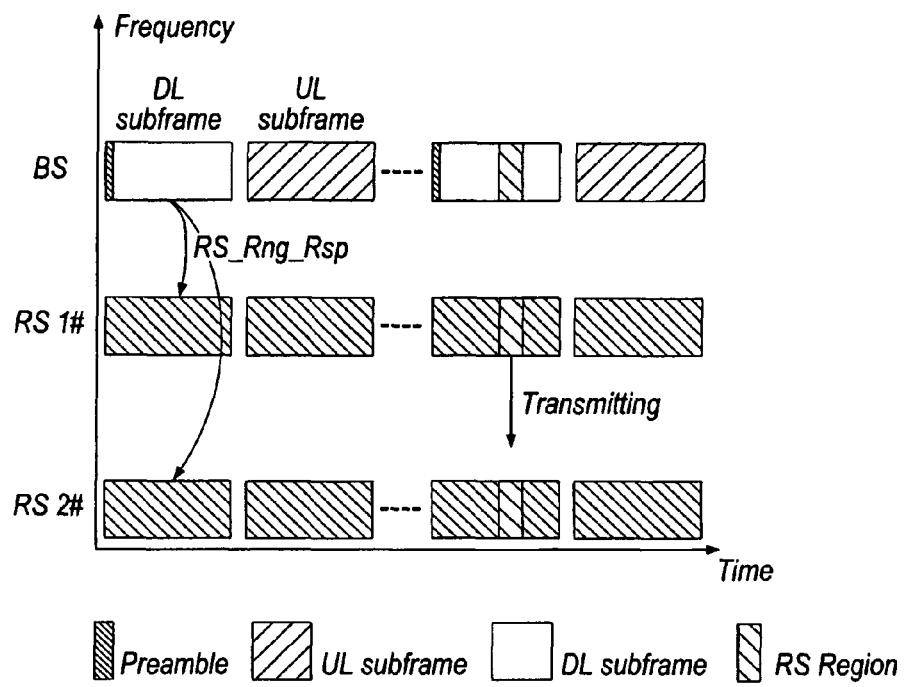
FIG. 5 shows that a BS can directly instruct an RS region without any request from RSs.
Figure 6:
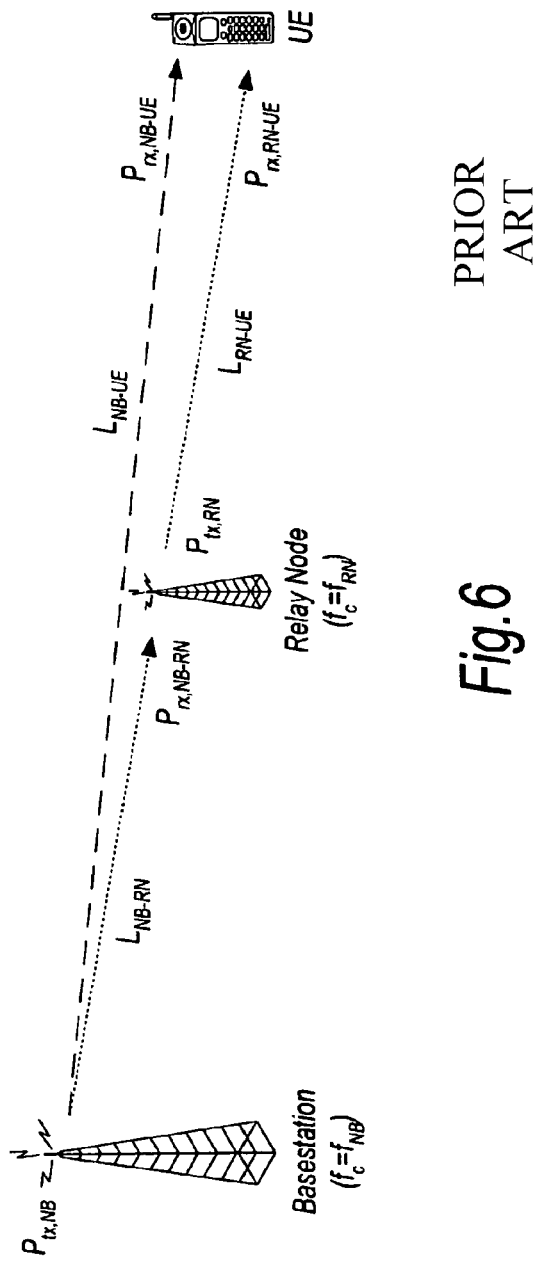
FIG. 6 shows a single-cell two-hop wireless communication system.
Figure 7A:
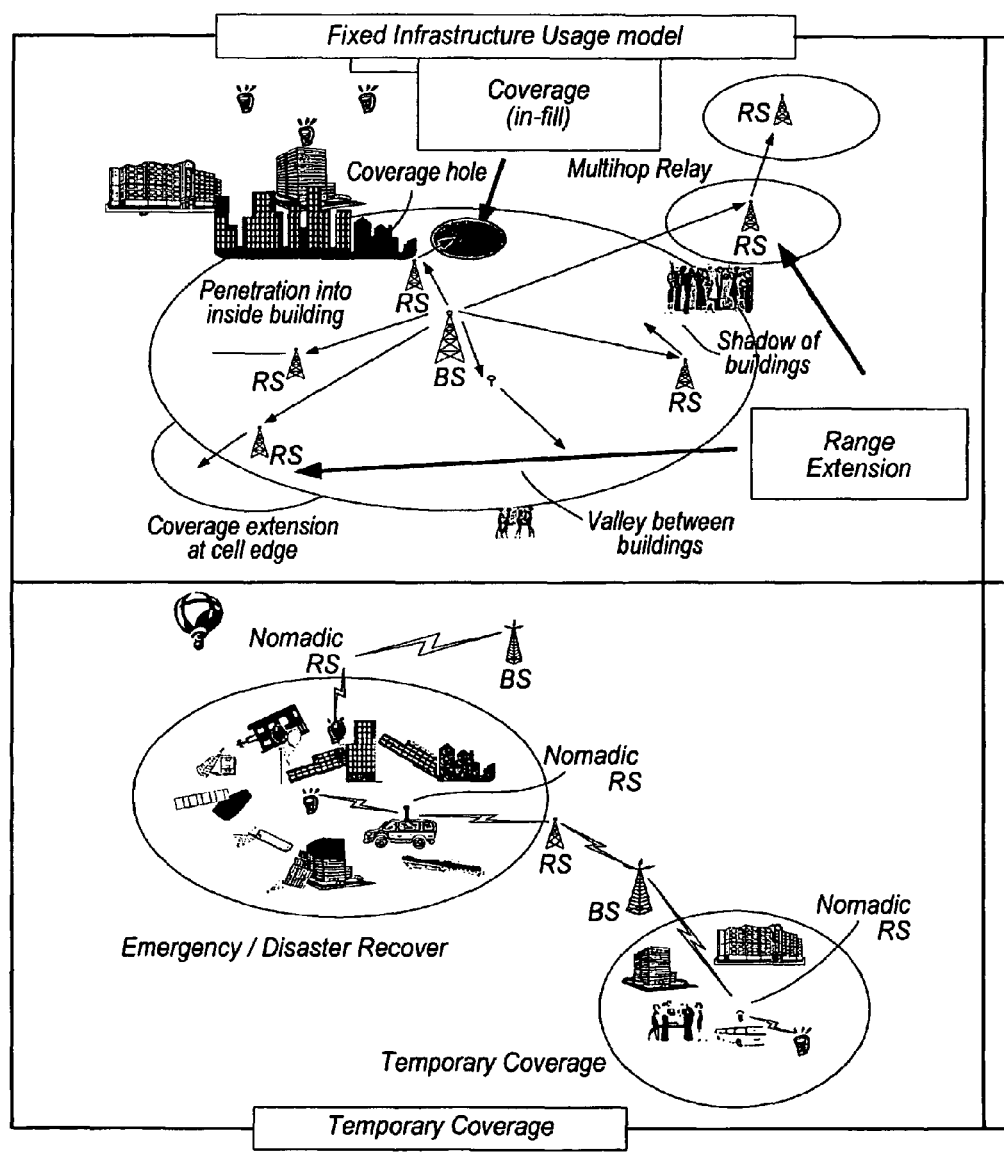
FIG. 7 shows applications of relay stations.
Figure 7B:
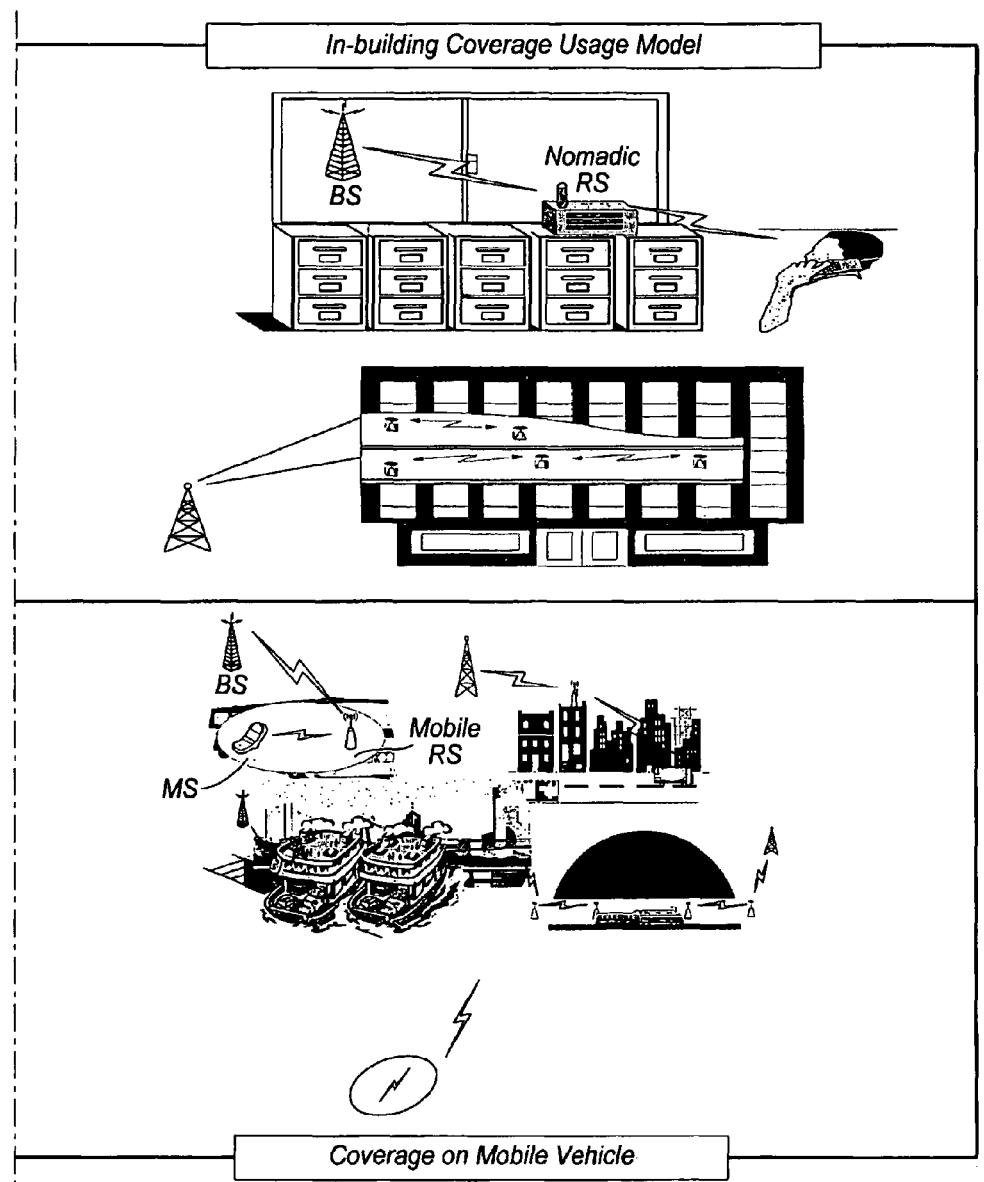
Figure 8:
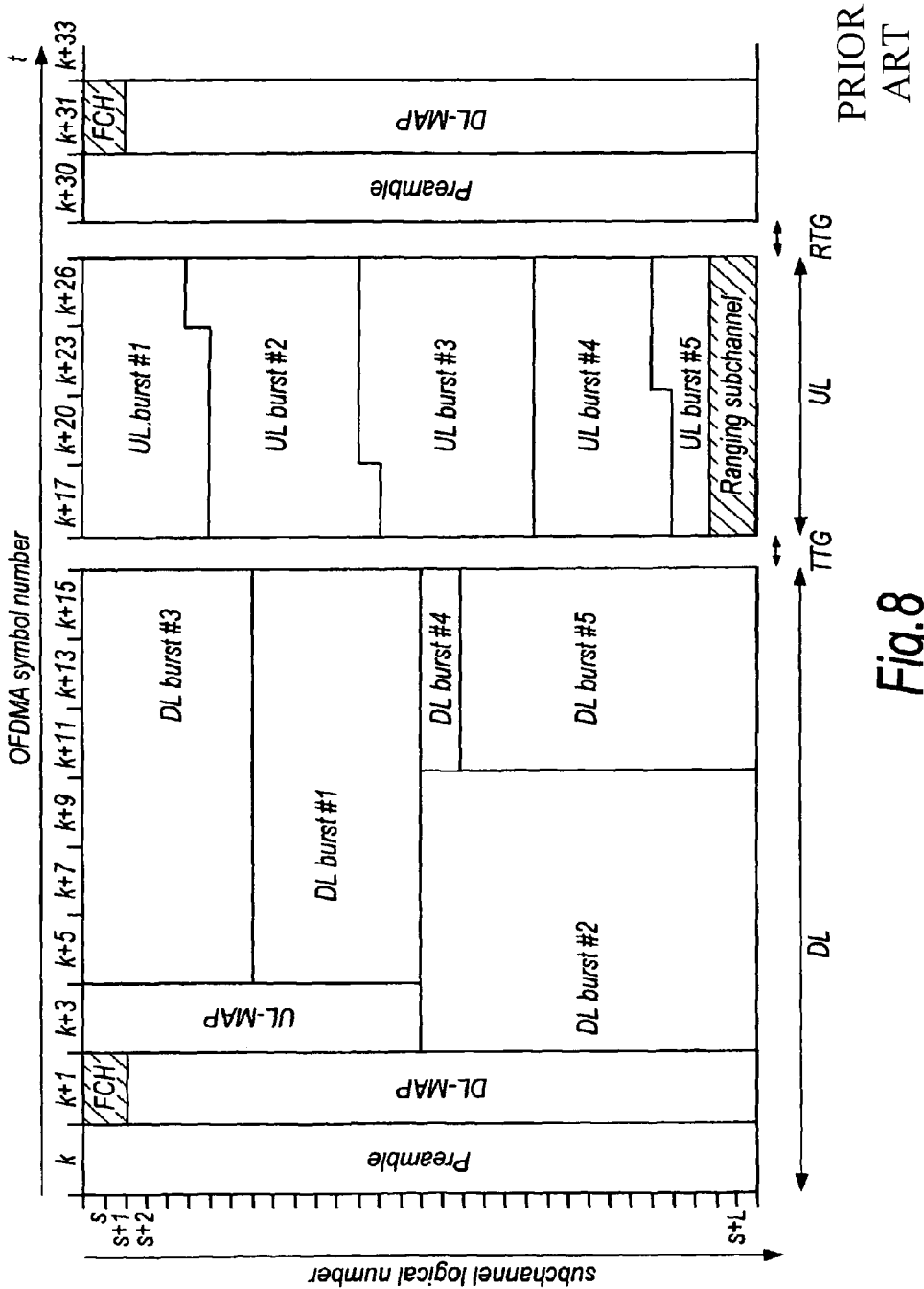
FIG. 8 shows a single hop TDD frames structure used in the OFDMA physical layer mode of the IEEE 802.16 standard.

RS regions can be specified by BS directly without any request from RS. As shown in FIG. 5, the BS directly instruct an RS region for all RSs by sending RS_Rng_Rsp message. More information can be enclosed in this message.

In multi-hop relay systems, the messages, such as RS_Rng_Req, and RS_Rng_Rsp, can be relayed, thus allowing a multi-hop relay station to request RS regions.

Embodiments of the present invention may be implemented in hardware, or as software modules running on one or more processors, or on a combination thereof. That is, those skilled in the art will appreciate that a microprocessor or digital signal processor (DSP) may be used in practice to implement some or all of the functionality of a transmitter embodying the present invention. The invention may also be embodied as one or more device or apparatus programs (e.g. computer programs and computer program products) for carrying out part or all of any of the methods described herein. Such programs embodying the present invention may be stored on computer-readable media, or could, for example, be in the form of one or more signals. Such signals may be data signals downloadable from an Internet website, or provided on a carrier signal, or in any other form.

Summary of Benefits

In summary, benefits of particular embodiments of the invention may include:

1. Through the associated improvement in flexibility of reserving windows, to improve an OFDMA (such as WiMAX) system;
2. To afford a feasible way to reserve windows, thus affording flexibility to the frame structure, and network deployment;
3. A signaling mechanism is designed for the proposed window reservation method, which can be compatible with WiMAX standard;
4. More flexible for moving centralized algorithm to distributed style. A distributed implementation can release the computation and signaling load in BS;
5. The proposed reserved window can be used for multiple purposes, such as channel sounding, handover, routing discovery and maintenance etc.
6. The window reservation is a flexible way of avoiding interference in a relay system.

Possible Application of the RS Access Downlink Safety Region to IEEE802.16E-2005: Window Reservation Contribution In a MR network with distributed control [1], the RS is responsible for resource allocation on its access link, constructing the DL and UL MAP information and associated IEs in the RS. Consequently, there exists no mechanism that enables the MR-BS (or superordinate RS) to send a message to the RS to instruct it not to allocate a region of the access downlink at the RS for transmission to the SSs that it serves.

In order to allow an MR-BS (or RS) to indicate to the RS a region that is reserved for non-transmission on its access downlink a new DL-MAP IE is proposed to be transmitted on the R-Link [2] from the MR-BS or RS to RS to indicate the reserved or "safety" region on its access downlink. The RS upon receiving a "RS_DL_Safety_Region_IE" on its R-Link will then reserve this region in the access DL on the next DL subframe.

Proposed Changes to IEEE802.16E-2005
[Change the items in Table 277a in Section 8.4.5.3.2.1 as indicated:]
0A RS_Access_DL_Safety_Region_IE
[Insert new subclause 8.4.5.3.29:]
8.4.5.3.29 RS_Access_DL_Safety_Region_IE In the DL-MAP on the relay link, an MR-BS or RS may transmit DIUC=15 with the RS_Access_DL_Safety_Region_IE( ) to indicate the location of region that shall be reserved for non-transmission on the RS access DL in the next DL subframe.

TABLE 286ab

| RS_Access_DL_Safety_Region_IE | | |
| --- | --- | --- |
| Syntax | Size | Notes |
| RS_Access_DL_Safety_Region_IE( ){ | | |
| Extended DIUC | 4 bits | RS_Access_DL_Safety_Region_IE = 0x0A |
| Length | 4 bits | |
| OFDMA symbol offset | 8 bits | |
| OFDMA subchannel offset | 8 bits | |
| Number of OFDMA symbols | 7 bits | |
| Number of subchannels | 6 bits | |
| } | | |

What is claimed is:

1. A transmission method for use in a multi-hop wireless communication system, the system comprising a source apparatus, a destination apparatus and one or more intermediate apparatuses, said source apparatus being operable to transmit information in a communication direction along a series of links forming a communication path extending from the source apparatus to the destination apparatus via the or each intermediate apparatus, and the or each intermediate apparatus being operable to receive information from a previous apparatus along the path and to transmit the received information to a subsequent apparatus along the path, a time-frequency format being used for transmission in the system, with a plurality of transmission windows included within transmission period, the method comprising:

transmitting reservation information for use in a particular such transmission period from a first one of said apparatuses to a second one of said apparatuses, the second apparatus being the or one of the intermediate apparatuses, and the reservation information specifying at least one transmission window to be reserved of the particular transmission period; and in the second apparatus, reserving the specified window(s) of the particular transmission period in dependence upon the received reservation information; the method further comprising:

as a result of the reserving in the second apparatus or in the plurality of intermediate apparatuses, not transmitting from that or those apparatuses in the specified window(s) of the particular transmission period so that that or those apparatuses will not interfere with other transmissions occurring during the specified window(s); or as a result of the reserving in the second apparatus or in the plurality of intermediate apparatuses, transmitting non-information-carrying signals from that or those apparatuses in the specified window(s) of the particular transmission period.

2. A transmission method according to claim 1, wherein the first apparatus is said source apparatus, or wherein the system comprises at least two said intermediate apparatuses, and the first apparatus is one of the intermediate apparatuses.

3. A transmission method according to claim 1, wherein the system comprises more than one said intermediate apparatus, the method comprising:

transmitting said reservation information to each of a plurality of said intermediate apparatuses including said second apparatus; and in each intermediate apparatus of said plurality of apparatuses, reserving the specified window(s) of the particular transmission interval in dependence upon the received reservation information.

4. A transmission method according to claim 1, comprising:
- as a result of the reserving in the second apparatus or in the plurality of intermediate apparatuses, not transmitting from that or those apparatuses in the specified window(s) of the particular transmission interval so that that or those apparatuses will not interfere with other transmissions occurring during the specified window(s); or
- as a result of the reserving in the second apparatus or in the plurality of intermediate apparatuses, transmitting non-information-carrying signals from that or those apparatuses in the specified window(s) of the particular transmission interval.

5. A transmission method according to claim 1, comprising transmitting the reservation information during a transmission interval immediately preceding the particular transmission interval or during the particular transmission interval.

6. A transmission method according to claim 1, wherein said reservation information is for use in a plurality of transmission intervals including the particular transmission interval, the method comprising carrying out said reserving for each of the plurality of transmission intervals.

7. A transmission method according to claim 6, wherein said reservation information is persistent reservation information, the method comprising carrying out said reservation for the plurality of transmission intervals one-by-one in turn until receipt of deallocation information cancelling the persistent reservation information.

8. A transmission method according to claim 1, wherein the second apparatus is responsible for the allocation of such transmission windows during such transmission intervals to at least one of said apparatuses along the path away from the source apparatus.

9. A transmission method for use in a multi-hop wireless communication system, the system comprising a source apparatus, a destination apparatus and one or more intermediate apparatuses, said source apparatus being operable to transmit information in a communication direction along a series of links forming a communication path extending from the source apparatus to the destination apparatus via the or each intermediate apparatus, and the or each intermediate apparatus being operable to receive information from a previous apparatus along the path and to transmit the received information to a subsequent apparatus along the path, a time-frequency format being used for transmission in the system, with a plurality of transmission windows included within a transmission period, the method comprising:
- transmitting reservation information for use in a particular such transmission period from a first one of said apparatuses to a second one of said apparatuses, the second apparatus being the or one of the intermediate apparatuses, and the reservation information specifying at least one transmission window to be reserved of the particular transmission period; and
- in the second apparatus, reserving the specified window(s) of the particular transmission period in dependence upon the received reservation information;
- wherein:
  - said communication direction is a downlink direction;
  - said destination apparatus is operable to transmit information in an uplink direction opposite to said downlink direction along the communication path to the source apparatus via the or each intermediate apparatus, and the or each intermediate apparatus is operable to receive information from a previous apparatus in the uplink direction along the path and to transmit the received information to a subsequent apparatus in the uplink direction along the path; and
  - said time-frequency format is also for use in assigning available transmission frequency bandwidth for transmission in the uplink direction.

10. A transmission method according to claim 9, comprising:
- as a result of the reserving in the second apparatus, controlling transmissions from a third one of said apparatuses located along the path in the communication direction from the first apparatus.

11. A transmission method according to claim 10, wherein said controlling is such that the third apparatus does not transmit in the specified window(s) of the particular transmission interval or such that the third apparatus transmits a non-information-carrying signal in the specified window(s) of the particular transmission interval.

12. A transmission method according to clam 11, wherein said controlling is such that the third apparatus transmits a known signal in the specified window(s) of the particular transmission interval for use in a sounding method.

13. A transmission method according to claim 9, wherein the reservation information specifies at least two transmission windows to be reserved, one of those transmission windows being for transmission in the downlink direction, and the other one of those transmission windows or another one of those transmission windows being for transmission in the uplink direction.

14. A transmission method for use in a multi-hop wireless communication system, the system comprising a source apparatus, a destination apparatus and one or more intermediate apparatuses, said source apparatus being operable to transmit information in a communication direction along a series of links forming a communication path extending from the source apparatus to the destination apparatus via the or each intermediate apparatus, and the or each intermediate apparatus being operable to receive information from a previous apparatus along the path and to transmit the received information to a subsequent apparatus along the path, a time-frequency format being used for transmission in the system, with a plurality of transmission windows included within a transmission period, the method comprising:
- transmitting reservation information for use in a particular such transmission period from a first one of said apparatuses to a second one of said apparatuses, the second apparatus being the or one of the intermediate apparatuses, and the reservation information specifying at least one transmission window to be reserved of the particular transmission period; and
- in the second apparatus, reserving the specified window(s) of the particular transmission period in dependence upon the received reservation information;
- wherein said reservation information is first reservation information and wherein said particular transmission interval is a first transmission interval, the method further comprising:
  - following the transmission of said first reservation information, transmitting second reservation information different from said first reservation information for use in a second transmission interval subsequent to said first transmission interval from the first apparatus to the second apparatus, the second reservation information specifying at least one window to be reserved of the second transmission interval; and
  - in the second apparatus, reserving the specified window(s) of the second transmission interval in dependence upon the received second reservation information; wherein the location of the at least one window specified by the second reservation information within the second transmission interval is different from the location of the at least one window specified by the first reservation information within the first transmission interval.

15. A transmission method for use in a multi-hop wireless communication system, the system comprising a source apparatus, a destination apparatus and one or more intermediate apparatuses, said source apparatus being operable to transmit information in a communication direction along a series of links forming a communication path extending from the source apparatus to the destination apparatus via the or each intermediate apparatus, and the or each intermediate apparatus being operable to receive information from a previous apparatus along the path and to transmit the received information to a subsequent apparatus along the path, a time-frequency format being used for transmission in the system, with a plurality of transmission windows included within a transmission period, the method comprising:

transmitting reservation information for use in a particular such transmission period from a first one of said apparatuses to a second one of said apparatuses, the second apparatus being the or one of the intermediate apparatuses, and the reservation information specifying at least one transmission window to be reserved of the particular transmission period; and in the second apparatus, reserving the specified window(s) of the particular transmission period in dependence upon the received reservation information;

wherein each said discrete transmission interval is a subframe period, and each said transmission window comprises a region or a zone in an OFDM or OFDMA frame structure.

16. A multi-hop wireless communication system comprising:

a source apparatus, a destination apparatus and one or more intermediate apparatuses, said source apparatus being operable to transmit information in a communication direction along a series of links forming a communication path extending from the source apparatus to the destination apparatus via the or each intermediate apparatus, and the or each intermediate apparatus being operable to receive information from a previous apparatus along the path and to transmit the received information to a subsequent apparatus along the path;

time-frequency format being used for transmission in the system with a plurality of transmission windows being included within a transmission period;

transmission means provided in a first one of said apparatuses and operable to transmit reservation information for use in a particular such transmission period from the first apparatus to a second one of said apparatuses, the second apparatus being the or one of the intermediate apparatuses, and the reservation information specifying at least one transmission window to be reserved of the particular transmission period; and reservation means provided in the second apparatus and operable to reserve the specified window(s) of the particular transmission period in dependence upon the received reservation information as a result of the reserving in the second apparatus or in the plurality of intermediate apparatuses, not transmitting from that or those apparatuses in the specified window(s) of the particular transmission period so that that or those apparatuses will not interfere with other transmissions occurring during the specified window(s); or as a result of the reserving in the second apparatus or in the plurality of intermediate apparatuses, transmitting non-information-carrying signals from that or those apparatuses in the specified window(s) of the particular transmission period.

17. One or more non-transitory storage media, storing a suite of computer programs which, when executed on computing devices of a multi-hop wireless communication system, causes the system to carry out a transmission method, the system comprising a source apparatus, a destination apparatus and one or more intermediate apparatuses, said source apparatus being operable to transmit information in a communication direction along a series of links forming a communication path extending from the source apparatus to the destination apparatus via the or each intermediate apparatus, and the or each intermediate apparatus being operable to receive information from a previous apparatus along the path and to transmit the received information to a subsequent apparatus along the path, a time-frequency format being used for transmission in the system, with a plurality of transmission windows included within transmission period, the method comprising:

transmitting reservation information for use in a particular such transmission period from a first one of said apparatuses to as second one of said apparatuses, the second apparatus being the or one of the intermediate apparatuses, the reservation information specifying at least one transmission window to be reserved of the particular transmission period; and in the second apparatus, reserving the specified window(s) of the particular transmission period in dependence upon the received reservation information; the method further comprising:

as a result of the reserving in the second apparatus or in the plurality of intermediate apparatuses, not transmitting from that or those apparatuses in the specified window(s) of the particular transmission period so that that or those apparatuses will not interfere with other transmissions occurring during the specified window(s); or as a result of the reserving in the second apparatus or in the plurality of intermediate apparatuses, transmitting non-information-carrying signals from that or those apparatuses in the specified window(s) of the particular transmission period.

18. A transmission method for use in a particular intermediate apparatus of a multi-hop wireless communication system, the system comprising a source apparatus, a destination apparatus and one or more intermediate apparatuses, said source apparatus being operable to transmit information in a communication direction along a series of links forming a communication path extending from the source apparatus to the destination apparatus via the or each intermediate apparatus, and the or each intermediate apparatus being operable to receive information from a previous apparatus along the path and to transmit the received information to a subsequent apparatus along the path, a time-frequency format being used for transmission in the system, with a plurality of transmission windows within a transmission period, the method comprising:

receiving reservation information for use in a particular such transmission interval from a first one of said apparatuses the reservation information specifying at least one transmission window to be reserved of the particular transmission interval; and reserving the specified window(s) of the particular transmission interval for non-transmission or transmission of a non-information carrying signal in dependence upon the received reservation information.

19. A particular intermediate apparatus of a multi-hop wireless communication system, the system comprising:
a source apparatus, a destination apparatus and one or more intermediate apparatuses, said source apparatus being operable to transmit information in a communication direction along a series of links forming a communication path extending from the source apparatus to the destination apparatus via the or each intermediate apparatus, and the or each intermediate apparatus being operable to receive information to a subsequent apparatus along the path; and the particular intermediate apparatus comprising:
a time-frequency format being used for transmission in the system, with a plurality of transmission windows within such a transmission period;
receiving means operable to receive reservation information from a first one of said apparatuses for use in a particular such transmission interval, the reservation information specifying at least one transmission window to be reserved of the particular transmission interval; and
reservation means operable to reserve the specified window(s) of the particular transmission interval for non-transmission or transmission of a non-information carrying signal in dependence upon the received reservation information.

20. One or more non-transitory store media storing a computer program which, when executed on a computing device of a particular intermediate apparatus in a multi-hop wireless communication system, causes the particular intermediate apparatus to carry out a transmission method, the system comprising a source apparatus, a destination apparatus and one or more intermediate apparatuses, said source apparatus being operable to transmit information in a communication direction along a series of links forming a communication path extending from the source apparatus to the destination apparatus via the or each intermediate apparatus, and the or each intermediate apparatus being operable to receive information from a previous apparatus along the path and to transmit the received information to a subsequent apparatus along the path, a time-frequency format being used for transmission in the system, with a plurality of transmission windows within a transmission period, the method comprising:
receiving reservation information for use in a particular such transmission interval from a first one of said apparatuses, the reservation information specifying at least one transmission window to be reserved of the particular transmission interval; and
reserving the specified window(s) of the particular transmission interval for non-transmission or transmission of a non-information carrying signal in dependence upon the received reservation information.

21. A transmission method for use in a multi-hop wireless communication system, the system comprising a source apparatus, a destination apparatus and one or more intermediate apparatuses, said source apparatus being operable to transmit information in a communication direction along a series of links forming a communication path extending from the source apparatus to the destination apparatus via the or each intermediate apparatus, and the or each intermediate apparatus being operable to receive information from a previous apparatus along the path and to transmit the received information to a subsequent apparatus along the path, a time-frequency format being used for transmission in the system, with a plurality of transmission windows included within a transmission period, the method comprising:
transmitting reservation information for use in a particular transmission period from a first one of said apparatuses to a second one of said apparatuses, the second apparatus being the or one of the intermediate apparatuses, and the reservation information specifying at least one transmission window to be reserved of the particular transmission period; and
in the second apparatus, reserving the specified window of the particular transmission period for non-transmission or transmission of a non-information-carrying signal in dependence upon the received reservation information; wherein
the specified window is in a part of the time-frequency format used in the particular transmission period for transmission by the second apparatus.

* * * * *